United States Patent [19]
Lafforthun

[11] Patent Number: 5,367,820
[45] Date of Patent: Nov. 29, 1994

[54] ANIMAL TRAP

[76] Inventor: David Lafforthun, 1383 W. Galway Rd., Galway, N.Y. 12074

[21] Appl. No.: 106,046

[22] Filed: Aug. 12, 1993

[51] Int. Cl.⁵ ............................................. A01M 23/02
[52] U.S. Cl. ............................................. 43/61; 43/60
[58] Field of Search ................... 43/61, 60, 58, 69, 70, 43/71, 72

[56] References Cited

U.S. PATENT DOCUMENTS

| | | | |
|---|---|---|---|
| 665,847 | 1/1901 | Barton | 43/61 |
| 1,186,238 | 6/1916 | Smyrski | 43/60 |
| 1,226,641 | 5/1917 | Cushing | 43/60 |
| 1,861,478 | 6/1932 | Kleffman | 43/61 |
| 3,426,470 | 2/1969 | Rudolph | 43/61 |
| 4,829,700 | 5/1989 | Ha | 43/61 |

Primary Examiner—P. Austin Bradley
Assistant Examiner—Chuck Y. Mah
Attorney, Agent, or Firm—Heslin & Rothenberg

[57] ABSTRACT

An animal trap is provided which facilitates the humane capture of animals, especially rodents such as mice. The main components of the trap include a valve and latch located within a housing. The latch moves in response to movement of a plate within the housing, upon which bait is placed, releasing the valve to securely seal an entrance way into the housing. The valve is guided into the entrance way by a shaft.

11 Claims, 4 Drawing Sheets

ANIMAL TRAP

FIELD OF THE INVENTION

The invention relates in general to an animal trap, and more particularly to a trap which humanely captures an animal by utilizing a housing with an entrance way that is sealed in response to an animal's movement to bait placed within the housing.

BACKGROUND OF THE INVENTION

Animal traps exist which permit the humane capture of animals. Humane capture is especially desirable for the trapping of rodents, such as mice or rats, that may inhabit human dwellings. Numerous types of traps have been devised which effect the capture of animals without injury thereto (see, e.g., U.S. Pat. Nos. 2,478,605, 2,524,504, 3,975,857, and 4,682,440). Many of these traps have intricate designs and are therefore not suitable for manufacture on a large scale.

Consequently, a need continues to exist for an animal trap which is both safe and effective in the humane capture of animals, especially rodents, as well as readily manufacturable.

SUMMARY OF THE INVENTION

This need is met by the animal trap according to the subject invention. The main components of the animal trap include a housing, a valve, a plate, and a latch. The housing has an entrance way which is sealable by a movable valve. A plate for holding bait is movably mounted within the housing, and the latch extends from the plate. When the trap is set, the plate is in an initial set position such that the latch holds the valve in a position away from the entrance way. When the plate is moved in response to the weight of an animal seeking the bait, the latch is moved away from the valve allowing the valve to be released to seal the entrance way.

In one embodiment of the subject invention, the housing is provided with a bottom surface which is raised in relation to any structure upon which the trap is placed. The entrance way is located in the bottom surface, allowing rodents to follow their natural instinct to climb up through the entrance way and into the trap.

In another embodiment, the valve is guided on a shaft which is mounted to the housing. The shaft extends through an aperture in the valve, and by sliding the valve along the shaft, the valve can be moved toward and away from the entrance way in a guided manner. This ensures a secure seal of the entrance way by the valve upon capture of an animal.

It is also possible to provide a spring on the shaft to exert pressure on the movement of the valve, i.e. to spring-load the valve. This is especially useful when the entrance way is not in the bottom surface of the housing and therefore the force of gravity does not assist in movement of the valve upon release by the latch.

Accordingly, one object of the present invention is the provision of a humane animal trap. Another object of the present invention is to provide a trap which is safe and sanitary, and which requires little or no contact with the captured animals.

A further object of the invention is the provision of an inexpensive and readily manufacturable trap which is easily set and which securely seals upon capture of an animal.

BRIEF DESCRIPTION OF THE FIGURES

These and other objects, features and advantages of this invention will be evident from the following detailed description of preferred embodiments when read in conjunction with the accompanying drawings in which.

DETAILED DESCRIPTION OF THE INVENTION

Figure 3:
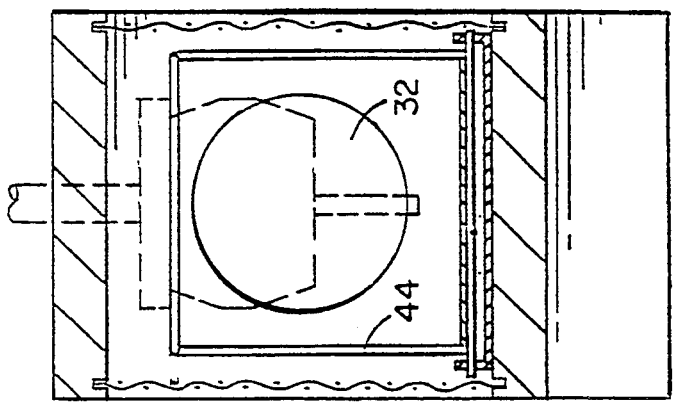
FIG. 3 is a cross-sectional end view of the animal trap shown in FIG. 1 in a set position.
Figure 1:
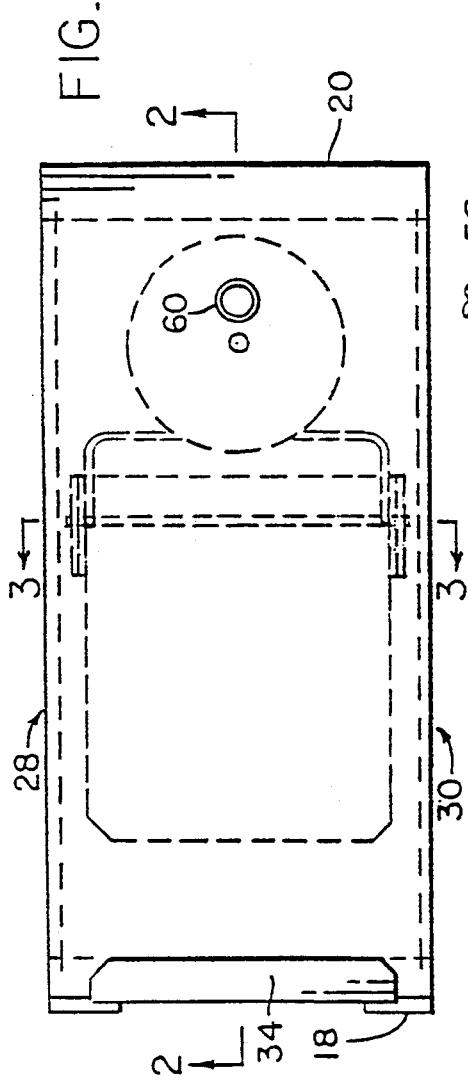
FIG. 1 is a top view of one embodiment of an animal trap according to the subject invention in a set position.

The main components of one embodiment of the subject invention are depicted in FIGS. 1-5, where like reference numerals denote the same components.

Figure 4:
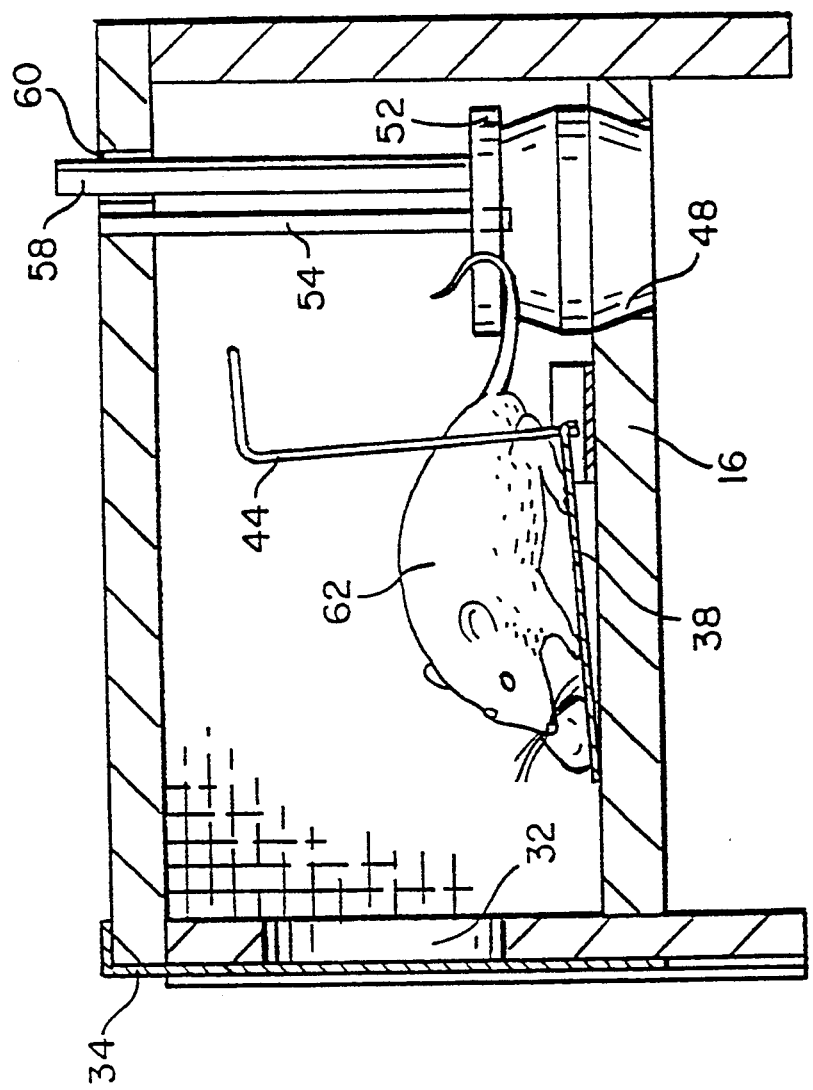
FIG. 4 is a cross-sectional side elevational view of the animal trap shown in FIGS. 1 and 2 in a sprung position.
Figure 5:
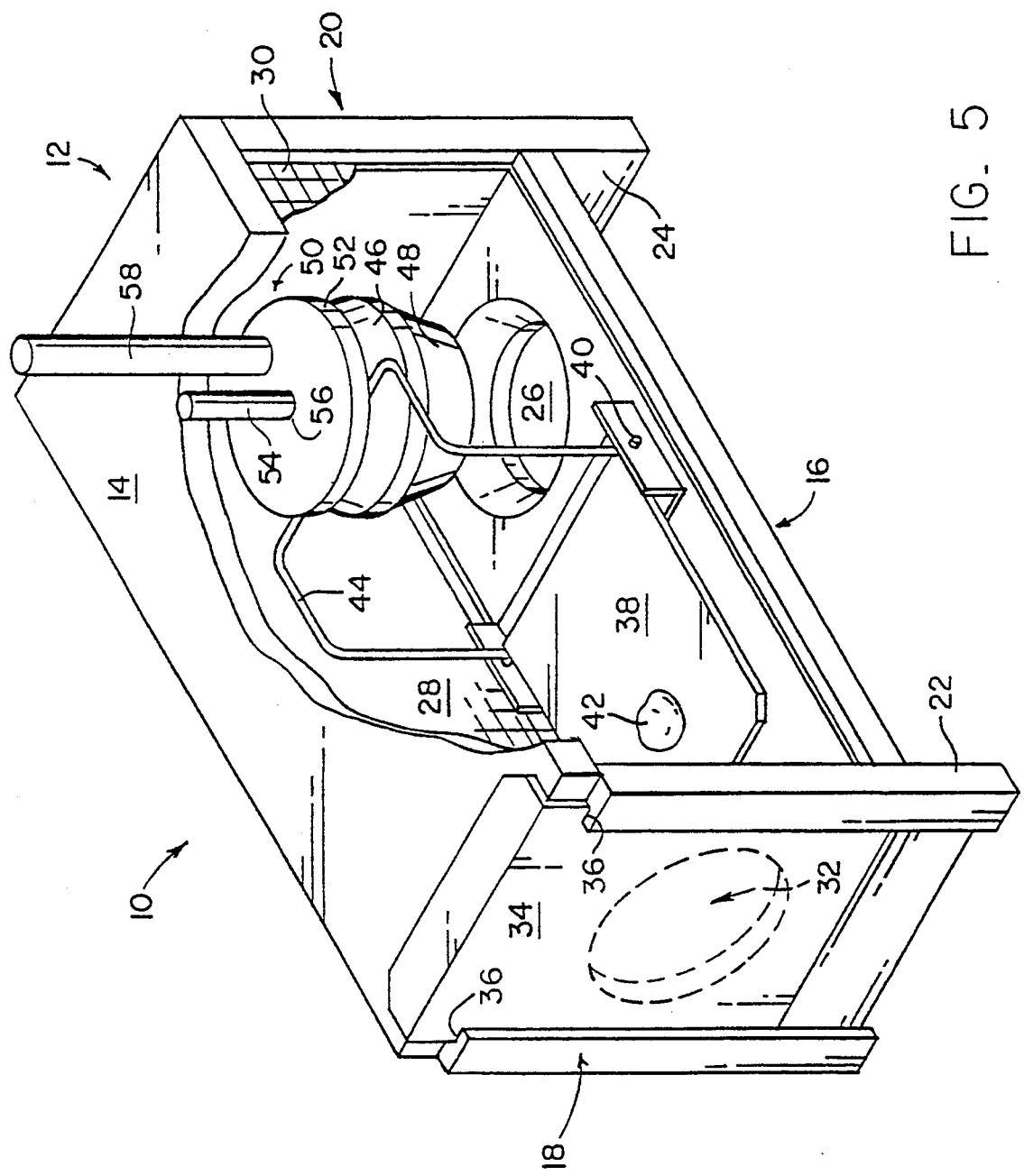
FIG. 5 is a partially cut-away isometric view of the animal trap shown in FIG. 1 in a set position.

Referring to FIG. 5, the animal trap 10 is shown in a partially cut-away isometric view. FIGS. 1-4 show the various features depicted in FIG. 5 from different angles. The housing 12 of the trap includes a top 14, a bottom 16, and two ends 18 and 20. The ends 18 and 20 have leg portions 22 and 24, respectively, which extend below the level of the bottom 16 so that the bottom 16 surface is raised. This allows entry of an animal through the entrance way 26 which is an aperture in the bottom 16 of the housing 12. The sides 28 and 30 of the housing comprise wire mesh. On the end 18 of the housing, another aperture 32 (shown in phantom) provides an exit way. This exit way is sealed by door 34 which slides within grooves 36 on the end 18 of the housing.

Within the housing 12 a plate 38 is securely mounted on a rotatable axis 40 to allow movement of the plate. Bait 42 is placed on the plate 38 to lure animals into the trap. Attached to the plate via the axis 40 is a latch 44, which comprises an L-shaped metal piece. The plate 38 and latch 44 are both connected to the axis 40, so that when movement of the plate 38 causes rotation of the axis 40, the latch 44 also moves.

The remaining component of the trap 10 is the valve 46. The valve 46 is generally spherically shaped and is beveled at its lower end 48 so that it fits securely and locks into the entrance way 26. The upper end 50 of the valve 46 has a lip 52 under which the latch 44 is held. Upon movement of the plate 38, the latch 44 moves away from the lip 52 releasing the valve 46.

The valve 46 is guided into the entrance way 26 for a secure fit by center shaft 54. Shaft 54 is securely mounted to housing 12 and extends through an aperture 56 in the valve 46. The valve 46 is slid up along shaft 54 to set the trap, and slides down the shaft 54 to seal the entrance way 26 when the trap is sprung. For further control over the guidance of movement of the valve 46, a second off-center shaft 58 is securely mounted to the valve 46. This second shaft 58 extends through an aperture 60 in the top 14 of the housing 12. This second shaft 58 allows the trap to be set more easily since it extends externally, permitting the valve 46 to be raised without reaching inside the housing. It should be readily apparent, however, that a second shaft is not necessary to operate the trap according to the subject invention.

Figure 2:
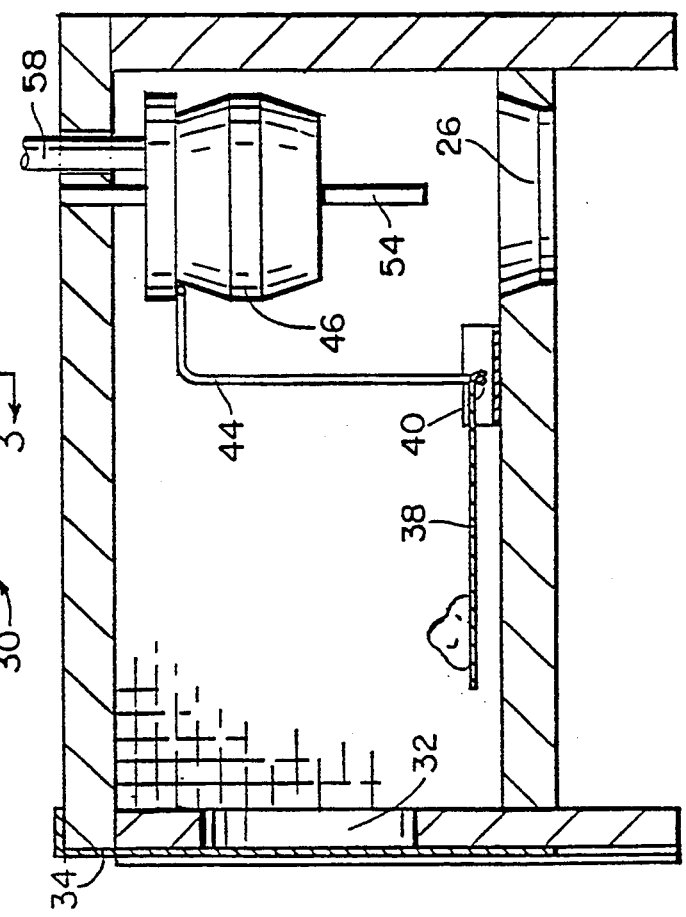
FIG. 2 is a cross-sectional side elevational view of the animal trap shown in FIG. 1 in a set position.

The operation of the trap is best shown in FIGS. 2 and 4. In FIG. 2, the valve 46 is held in a raised position along shaft 54 so that the entrance way 26 is open. Bait 42 is positioned on plate 38, and latch 44 is holding the valve 46 in this set position. When an animal such as a mouse 62 (see FIG. 4) enters the trap through the entrance way 26, the animal travels to the bait 42. The weight of the animal causes the plate 38 to shift from its substantially horizontal position, rotating the axis 40 as it shifts. This in turn moves the latch 44, which is also attached to the rotating axis 40, away from the lip 52 of the valve 46 (see FIG. 4). This releases the valve 46, which falls by gravitational forces and is guided by shaft 54 into the entrance way 26. With the entrance way 26 sealed by the valve 46 in this sprung position, the animal can no longer escape from the trap. For ease in removal of the captured animal, the door 34 can be opened to permit removal through the aperture 32 on the end 18 of the housing.

Various embodiments of the subject invention can be provided. Two such variations are shown in FIGS. 6 and 7.

Figure 6:
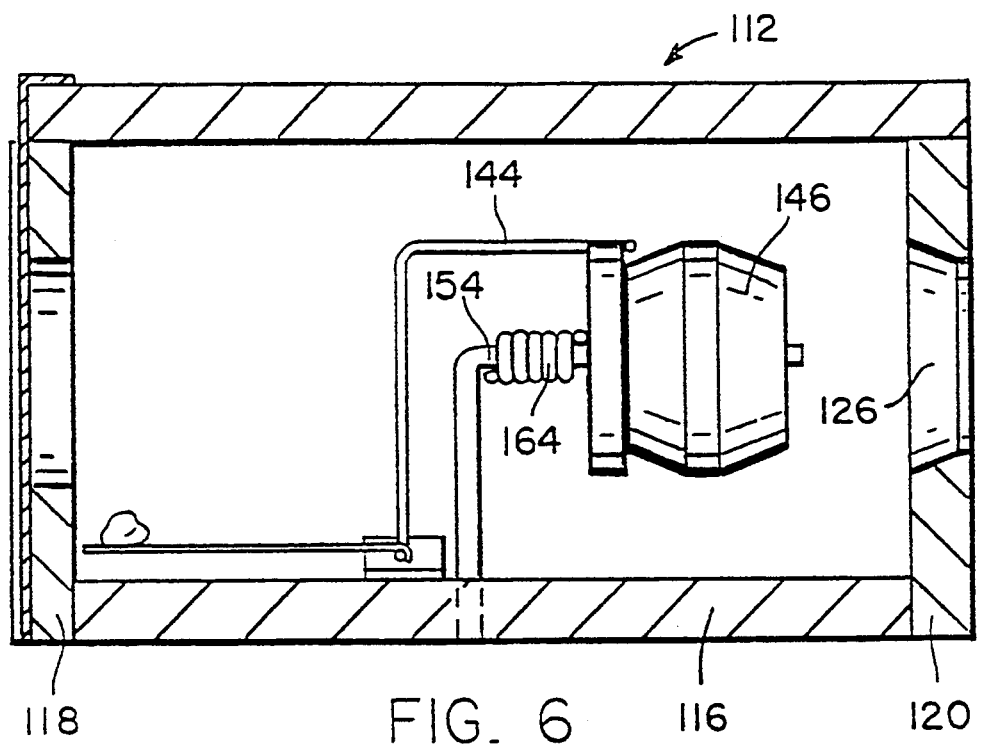
FIG. 6 is a cross-sectional side elevational view of another embodiment of the animal trap according to the subject invention with a spring-loaded valve in the set position.

Referring to FIG. 6, most components are similar to those depicted in FIGS. 1–5. However, the housing 112 no longer has legs extending from the ends 118 and 120 thereof. This prevents entry of an animal from the bottom 116 of the housing, therefore the entrance way 126 is positioned on end 120. The valve 146 therefore is mounted within the housing 112 on a vertically extending shaft 154. It should be readily apparent that in this embodiment gravity will not assist the movement of the valve 146 when it is released by the latch 144. Therefore, a spring 164 is mounted on shaft 154 to exert pressure on the valve 146 when the latch 144 releases the valve 146. The force of the spring 164 and the guidance of the shaft 154 direct the valve 146 securely into the entrance way 126 when the trap is sprung.

Figure 7:
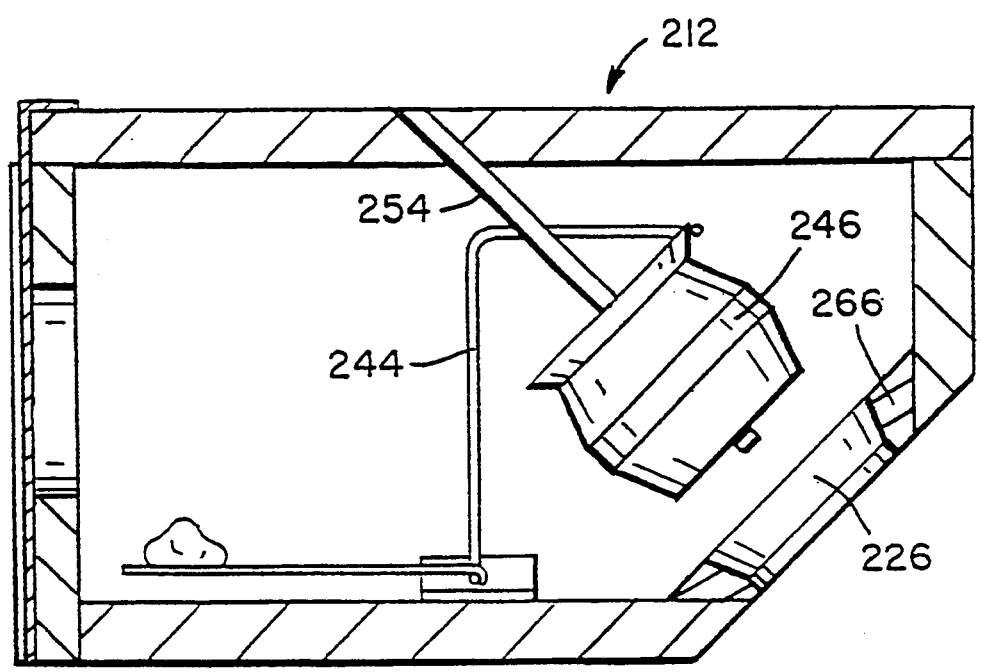
FIG. 7 is a cross-sectional side elevational view of a further embodiment of the animal trap according to the subject invention.

Another embodiment in which the valve 246 is mounted at an angle is shown in FIG. 7. In this embodiment, the housing 212 is provided with a corner wall 266 in which the entrance way 226 is positioned. As shown, gravitational forces move the valve 246 to seal the entrance way 226 upon release by the latch 244. Alternatively, a spring could also be utilized on shaft 254 in a similar manner to that depicted in FIG. 6.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A trap for the humane capture of animals, the trap comprising:
    a housing having a sealable entrance way;
    a valve having an aperture therein movably mounted on a first shaft within said housing for sealing said entrance way, said first shaft being mounted to said housing, wherein said shaft moves freely through said aperture;
    a second shaft mounted to said valve for guiding said valve, said second shaft moving freely through an aperture in said housing;
    a plate movably mounted within said housing; and
    a latch mounted to said plate and extendable to said valve:
    wherein when said plate is in a first set position, said latch holds said valve in a position away from said entrance way and wherein when said plate moves to a second sprung position, said latch releases said valve to seal said entrance way.

2. The trap of claim 1 further comprising a spring mounted around the longitudinal axis of said shaft for applying pressure to movement of said valve.

3. The trap of claim 1 wherein said housing has a bottom surface elevated from a structure on which said trap is placed.

4. The trap of claim 3 wherein said entrance way comprises an aperture in said bottom surface of said housing.

5. The trap of claim 1 further comprising a sealable exit way in said housing.

6. The trap of claim 5 further comprising a movable door to seal said exit way.

7. The trap of claim 1 wherein said valve has a lip thereon for holding said latch.

8. The trap of claim 1 further comprising bait on said plate.

9. The trap of claim 1 wherein said plate shifts to a sprung position when pressure is applied on said plate.

10. The trap of claim 9 wherein said pressure comprises the weight of a rodent.

11. The trap of claim 1 wherein said housing has sides thereof of wire mesh.

* * * * *